Dec. 13, 1966  R. J. REILLY  3,290,947

CONTROL APPARATUS

Filed April 3, 1963

INVENTOR.
RICHARD J. REILLY
BY
ATTORNEY

United States Patent Office 3,290,947
Patented Dec. 13, 1966

3,290,947
CONTROL APPARATUS
Richard J. Reilly, St. Paul, Minn., assignor to Honeywell Inc., a corporation of Delaware
Filed Apr. 3, 1963, Ser. No. 270,290
6 Claims. (Cl. 73—505)

This invention pertains to fluid amplifiers and more particularly to vortex fluid amplifiers.

A vortex fluid amplifier comprises a device which functions to provide amplification of a fluid signal by means of vortical fluid flow. The applicant's invention will be described as utilized in a specific embodiment of a vortex fluid amplifier referred to by those skilled in the art as a vortex rate sensor, although the invention by no means is limited to such an application. A vortex rate sensor is an apparatus which is capable of sensing the angular velocity (rate) about an axis of a body upon which the vortex rate sensor is applied. The measurement of angular velocity (rate) is, as is well understood, useful and/or necessary in many control systems. For example, an angular rate signal is very useful for control purposes in automatic flight and/or attitude control systems of aircraft and space craft.

A vortex fluid amplifier provides an output signal which is the amplification of a fluid input signal. It is highly desirable to obtain high levels of amplification in the vortex fluid amplifier. The level of amplification is determined, to a limited extent, by the geometric configuration of the vortex fluid amplifier. However, it can be shown that the amplification is a function of the density of the fluid and of the square of the velocity of the fluid. Consequently, one approach to obtaining a higher level of amplification is to maintain a higher velocity of the fluid. This approach is disclosed in the applicant's copending application Serial No. 162,819, filed December 28, 1961, now Pat. No. 3,253,218, and assigned to the same assignee as the present invention.

Another way to improve the performance of such a device is to utilize working fluids of relatively high density. However, it has been shown, both theoretically and experimentally, that merely providing a more dense fluid does not result in a more sensitive instrument. The reason is that the more dense fluids, in general, also have higher viscosity and the resulting increased frictional losses negate much of the advantage gained by the utilization of a higher density fluid. However, the applicant's invention substantially eliminates the frictional losses of the more dense fluid and provides an improved vortex fluid amplifier with higher amplification. This is accomplished by providing means for providing a fluid along the surfaces of the vortex fluid amplifier which functions to substantially reduce the viscous losses in the flow of the higher density fluid through the vortex fluid amplifier.

It is an object of this invention to provide an improved vortex fluid amplifier.

This and other objects of the invention will become apparent from a study of the accompanying specification and claims in conjunction with the drawings in which:

Figure 1:
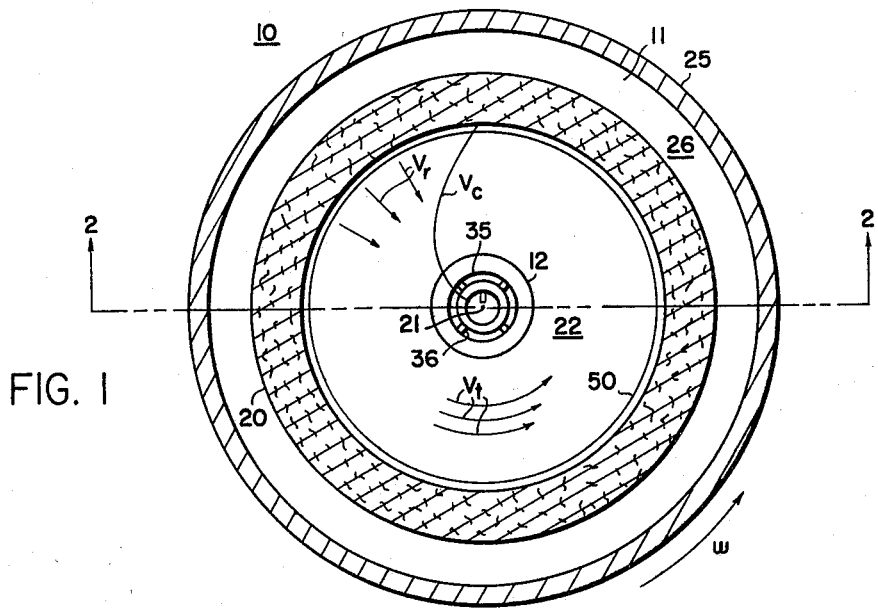
FIGURE 1 is a schematic cross sectional view of a vortex fluid amplifier taken along lines 1—1 of FIGURE 2.
Figure 2:
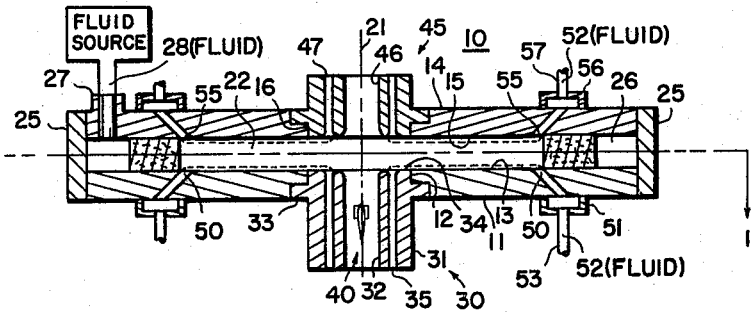
FIGURE 2 is a schematic cross sectional view of a vortex fluid amplifier taken along lines 2—2 of FIGURE 1.

Referring now to FIGURE 1, reference numeral 10 generally depicts a specific embodiment of a vortex fluid amplifier generally referred to by those skilled in the art as a vortex rate sensor. While the applicant's invention will be described as applied to this particular embodiment of a vortex fluid amplifier, it should be understood that the applicant's invention has application to all types of fluid amplifiers. A generally cylindrical plate member 11 is provided having a central aperture 12 of circular cross section therethrough. As illustrated in FIGURE 2, member 11 has a plane surface 13 thereon. A second generally cylindrical plate member 14 is provided having a plane surface 15 thereon. Member 14 has a central aperture 16 of circular cross section therethrough.

An annular porous coupling means 20 is positioned between plane surface 13 of member 11 and plane surface 15 of member 14, thereby maintaining plane surfaces 13 and 15 in a spaced, parallel relationship. Coupling means 20 is porous in nature so as to allow fluid to pass therethrough. In one particular embodiment porous means 20 is constructed of sintered metal, however it is also possible to utilize other porous coupling means such as screens, ceramics and the like. The applicant does not wish to be limited to the specific type of coupling element illustrated. The axis of cylindrical coupling means 20 is identified by reference numeral 21. Members 11 and 14 in conjunction with coupling means 20 collectively define a right cylindrical chamber 22. The outer periphery of chamber 22 is defined by porous coupling means 20. The ends of chamber 22 are defined by the plane surface 13 of member 11 and the plane surface 15 of member 14.

A generally ring-shaped element 25 is positioned around the outer periphery of member 11 and member 14 thus enclosing the space therebetween. Element 25 is rigidly attached to elements 11 and 14 by suitable means (not shown) such as screws or adhesives. Element 25 is spaced apart from coupling means 20 and in conjunction therewith defines a supply manifold 26 between the members 11 and 14. A fluid 28 is supplied from a fluid source to supply manifold 26 through a suitable ingress 27 as illustrated in FIGURE 2.

A first exit member 30 is provided. Exit member 30 comprises a tube 31 having a generally cylindrical bore or passage 32 therethrough. Other configurations of passage 32 are within the scope of this invention, and the applicant does not wish to be limited to the passage illustrated. Tube 31 has an external flange portion 33 on one end thereof. The flange portion 33 is positioned within aperture 12 of member 11 so that the axis of passage 32 is positioned substantially coaxial with axis 21. It is possible to deliberately offset the axis of passage 32 from axis 21 so as to take advantage of flow characteristics, therefore the applicant does not wish to be limited to the coaxial arrangement illustrated in FIGURE 2. An end surface 34 of exit member 30 is positioned so as to lie in the same plane as the plane surface 13 of member 11. An annular passage 35 is located within exit member 30 and extends along the whole axial extent thereof. A plurality of struts 36 extend across passage 35 so as to rigidly connect the inner and outer portions of tube member 31. The axis of annular passage 35 is positioned coaxial with axis 21. Annular passage 35 is in communication with chamber 22 at one end and the opposite end exhausts to the atmosphere. The function of annular passage 35 will be described in more detail hereinafter. Exit member 30 is positioned within member 11 and rigidly attached thereto by suitable means (not shown) such as adhesives or screws.

A pickoff means 40 is positioned within exit member 30. A suitable pickoff means is disclosed in applicant's copending application Serial No. 156,613, filed December 4, 1961, and assigned to the same assignee as the present invention. The copending application discloses a fluid flow sensor utilizing a blade element positioned between two pressure ports. The pressure differential across the blade element is indicative of the fluid flow pattern.

A second exit member 45 is provided which is identical to the first exit member 30 with the exception of the pickoff means 40. Second exit member 45 includes a cylindrical outlet passage 46 and an annular passage 47. Because of the similarity of exit member 45 and exit member 30, no further detailed discussion is deemed necessary. It should be noted that only one outlet passage is necessary for the operation of the vortex fluid amplifier, therefore, the applicant does not wish to be limited to the embodiment illustrated.

Member 11 has an annular passage 50 therethrough which is spaced apart from aperture 12. One end of passage 50 is in communication with chamber 22 and is located adjacent to the inner periphery of coupling means 20. The other end of annular passage 50 is in communication with a manifold means 51. A plurality of struts (not shown) in addition to manifold 51 bridge passage 50 so as to connect the two portions of member 11 together. The end of passage 50 which is in communication with chamber 22 is nearer to surface 13 than the opposite end so that passage 50 is inclined with respect to axis 21. A fluid 52 is supplied to manifold 51 from a fluid source (not shown) by means of a conduit 53. Member 14 has an annular passage 55 therethrough which is in communication with chamber 22 at one end thereof. The other end of annular passage 55 is in communication with a manifold element 56. A plurality of struts (not shown) in addition to manifold 56 bridge passage 55 so as to connect the two portions of members 14 together. Passage 55 is inclined with respect to surface 15. A fluid 52 is supplied to manifold element 56 from a fluid source (not shown) by means of a conduit 57.

OPERATION

In operation, pressure in manifold 26 is greater than in outlet passages 32 and 46. Consequently, fluid 28 flows from manifold 26 through coupling means 20, through chamber 22 and exhausts through outlet passages 32 and 46. In the absence of any input (when the means defining chamber 22 have no angular velocity about axis 21) the fluid flow from manifold 26 has only radial velocity as illustrated by the vectors $V_R$ in FIGURE 1. This radial flow pattern is described by those skilled in the art as a pure sink flow. To satisfy the equation of continuity, the radial velocity of a pure sink flow increases due to the narrowing of the streamlines as the fluid approaches the center of chamber 22, that is, passages 32 and 46.

As was stated earlier, the operation of the vortex fluid amplifier will be described with reference to a specific application as a vortex rate sensor. A vortex rate sensor is a device utilized to sense rate of turn (angular velocity) about an axis of a body upon which it is mounted. The measurement of angular velocity (rate) is utilized in aircraft rate of turn meters and in turn and bank indicators. Other applications for rate sensors are automatic flight control systems (autopilots) and direction seeking instruments. When vortex fluid amplifier or vortex rate sensor 10 is subjected to an input rate, an angular velocity $\omega$ about axis 21, fluid 28 which is flowing from manifold 26 through coupling means 20 is given a tangential or rotational velocity as illustrated by the vector $V_T$ in FIGURE 1. A fluid flow field of tangential or rotational velocity only is referred to by those skilled in the art as a pure vortex flow. The rotational velocity of the fluid increases as the fluid approaches the passages 32 and 46, in accordance with the application of the principle of conservation of angular momentum, for perfect fluids.

The superimposition of a pure vortex flow upon a pure sink flow results in a combined vortex-sink flow. The streamline pattern of the fluid in the combined vortex-sink flow is a logarithmic spiral, for perfect fluids, as identified by reference symbol $V_C$ in FIGURE 1. As the fluid flowing in the logarithmic spiral flow pattern reaches the center of chamber 22, it flows into passages 32 and 46. This results in a fluid flow pattern in the form of a helix in passages 42 and 52. That is, there is a component of fluid flow having a longitudinal velocity parallel to the axis 21 and a component of fluid flow having a rotational velocity perpendicular to axis 21. It should be noted that the component of fluid flow within passages 32 and 46 perpendicular to the axis 21 is indicative of the input rate $\omega$. Consequently pickoff means 40 provides an output signal indicative of the input rate $\omega$ by sensing the tangential or rotational component of the fluid flow within passage 32.

As the fluid 28 flows through chamber 22, since it is a real fluid, tangential frictional forces act upon the fluid which are generally referred to as viscous forces. As was pointed out earlier, the output signal of the vortex fluid amplifier pickoff means 40 is proportional to the density and to the square of the velocity of the fluid flowing through the chamber. Unfortunately, for many commonly used working fluids, the frictional losses associated with fluid 28 as it passes over the surfaces 13 and 15 also increase as the density of the fluid is increased, so that merely using a fluid (28) of greater density does not necessarily result in increased amplification.

However, the applicant has provided an improved fluid vortex amplifier wherein means are provided for substantially reducing the viscous losses inherent in the flow of a high density fluid. In the specific embodiment of FIGURES 1 and 2 the viscous losses are substantially reduced by introducing a second fluid 52 into the chamber 22 which flows along the surfaces 13 and 15. Fluid 52 is a gaseous fluid in this specific embodiment and has a viscosity substantially less than the viscosity of fluid 28. In another embodiment fluid 52 may be a liquid. In this specific embodiment fluid 28 is a liquid. In other embodiments, fluid 28 may be in the gaseous state. Fluid 52 is supplied to conduits 53 and 57 and to manifold means 51 and 56. Fluid 52 flows through annular passages 50 and 55 and enters chamber 22 adjacent to coupling means 20. Annular passage 50 is inclined with respect to surface 13 and annular passage 55 is inclined with respect to surface 15 so that fluid 52 is introduced substantially tangentially along the surfaces 13 and 15. Thus, fluid 52 forms a layer along surface 13 of member 11 and along surface 15 of member 14. Fluid 28 is thus isolated from surfaces 13 and 15 by means of fluid 52. It is clear that fluid 52 having a density of substantially less than fluid 28 has substantially less frictional or viscous loss in flowing through chamber 22 along surfaces 13 and 15. The result is that fluid 28 may be a very high density fluid such as a liquid so as to obtain a highly sensitive instrument, because of the increased amplification obtained. The introduction of fluid 52 substantially reduces the frictional losses normally inherent with the utilization of a high density high viscosity fluid. As fluid 52 approaches passages 32 and 46 it is withdrawn through annular passages 47 and 35 respectively. The purpose of removing the layer of fluid 52 before fluid 28 exhausts out of passages 32 and 46 is to minimize the effects of fluid 52 upon the pressure distribution sensed by pickoff means 40. It may not be necessary to remove the layer of fluid 52 if a different type of pickoff means is utilized.

Figure 3:
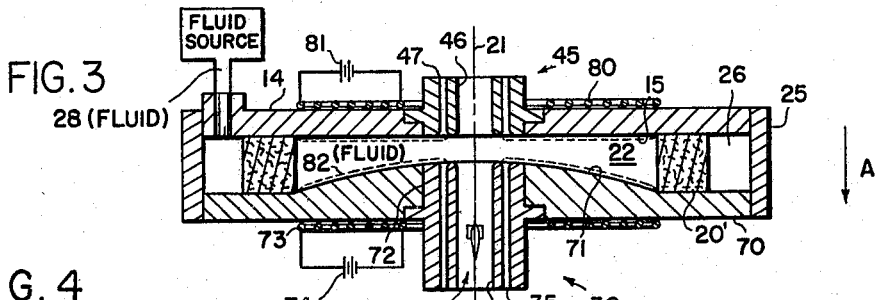
FIGURE 3 is a schematic cross sectional view of an alternate embodiment of a vortex fluid amplifier.

An alternate embodiment of the applicant's invention is illustrated in FIGURE 3. A number of the structural elements of the alternate embodiment illustrated in FIGURE 3 are similar to the elements described in detail in FIGURES 1 and 2. Consequently similar structural elements will be given the same reference numeral and will not be redescribed. It will be noted that member 11 of FIGURE 2 has been replaced by a member 70 of generally cylindrical shape. Member 70 has a convex surface 71 thereon which is faced toward plane surface 15 of member 13. Member 70 also has a central aperture 72 therethrough of circular cross section. A heating coil 73 is attached to the member 70 by suitable means (not shown). Heating coil 73 is in contact with the side of element 70 opposite convex surface 71. Heating coil 73 is connected to an energy source 74 by suitable means. A heating element 80 is rigidly attached to member 14 on the surface opposite from plane surface 15. Heating element 80 is connected to an energy source 81 by suitable means.

In operation, fluid 28 is caused to flow from manifold 26 through a coupling means 20' through chamber 22 and out of passages 32 and 46 as previously explained above with reference to FIGURES 1 and 2. However, a second fluid 82 is formed in chamber 22 in this embodiment, by heating members 14 and 70 to an elevated temperature so as to locally boil fluid 28. This results in the establishment of a gaseous film 82 on the chamber surfaces, 14 and 70, substantially reducing the frictional losses incurred by fluid 28 while flowing through the device, as described with reference to FIGURES 1 and 2. Once a gaseous film 82 is formed it serves a secondary function, that of providing a heat insulating layer, thus preventing further boiling of fluid 28. An analogous observation may be recalled where water dropped upon a hot surface moves about rapidly in a relatively frictionless fashion on a film of steam. The gaseous film not only provided the lubricant but also served as an insulating layer to prevent the droplets of water from rapidly boiling away. Another alternative is to heat high density fluid 28 adjacent surfaces 15 and 71 so as to reduce the viscosity thereof. Thus a layer of the same fluid, having a viscosity substantially less than the remainder of the fluid, insulates the remainder of the fluid from the surfaces 15 and 71 and functions to substantially reduce the frictional losses.

It is possible that the density of fluid 82 may be greater than the density of fluid 28, and still be less viscous. However, if fluid 28 has a density greater than fluid 82, it will be appreciated that in an acceleration field the low density fluid along one surface will be unstable. That is, if an acceleration is directed downwardly as indicated by arrow A in FIGURE 3, fluid 82 along surface 71 will tend to move toward surface 15. Fluid 82 along surface 15 will be stable since it is less dense than fluid 28 and will tend to remain along surface 15. The instability of fluid 82 along surface 71 can be overcome by creating an artificial force field which negatives the accelerational effect on fluid 82. This is the purpose of the convex surface 71 of plate element 70. More specifically as the fluid travels along the surface 71 it is in fact following a curved path about a center of rotation. As a fluid moves through a circular path with an angular velocity $\omega$, a normal acceleration is applied to the fluid directed towards the center rotation thereof. Consequently, more dense portions of the fluid are forced away from the center of rotation and the lighter particles are forced towards the center of rotation. The analogy of the well known cream operator may be useful in understanding the principle involved. In a cream separator a mixture of milk (the more dense fluid) and cream (the less dense fluid) is positioned within a container and rotated about an axis. The less dense fluid (cream) is forced towards the center of rotation and removed therefrom while the more dense material (milk) is forced to the outside of the container. The function of convex surface 71 is to create a force field which tends to overcome the accelaration A and forces the fluid 82 to remain along surface 71 of plate element 70.

Figure 4:
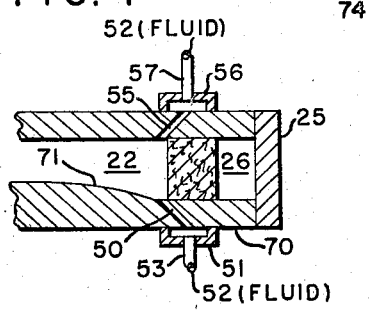
FIGURE 4 is a schematic partial cross sectional view of an alternate embodiment of a vortex fluid amplifier.

FIGURE 4 is a partial cross sectional view of a vortex rate sensor which combines the structure of FIGURES 2 and 3. More specifically, the vortex fluid amplifier illustrated in FIGURE 4 is similar to that illustrated in FIGURE 2, modified to include a convex surface therein such as illustrated in FIGURE 3. Similar structural elements are identified with the same reference numerals as utilized in FIGURES 2 and 3. Because a complete description of the structure and operation of the embodiments illustrated in FIGURES 2 and 3 has been given above, no further discussion is deemed necessary to understand the construction and operation of the fluid vortex amplifier illustrated in FIGURE 4.

Thus it is clear that the applicant has provided a unique vortex fluid amplifier wherein a high density fluid may be utilized so as to obtain a more sensitive instrument by providing means for substantially reducing the frictional losses inherent therein.

While I have shown and described a specific embodiment of this invention, further modifications and improvements will occur to those skilled in the art. I desire it to be understood therefore that this invention is not limited to the particular form shown and I intend in the appended claims to cover all modifications which do not depart from the spirit and scope of this invention.

I claim as my invention:

1. A vortex rate sensor comprising: a first member having a plane surface thereon; a second member having a plane surface thereon; coupling means positioned between said plane surface of said first member and said plane surface of said second member so as to form a chamber symmetrical about an axis; an outlet passage within said first member surrounding said axis; pickoff means located within said outlet passage; means for providing a high density fluid flow through said coupling means, said chamber and said outlet passage; a first annular passage within said first member and a second annular passage within said second member, said first and said second annular passages being in communication with said chamber at the periphery thereof; means for providing a flow of a low viscosity fluid through said first and second annular passages, said low viscosity fluid forming a layer intermediate said high density fluid and said plane surfaces so as to substantially reduce the viscous losses in the flow of said high density fluid through said chamber; and first and second removal passages located within said first and second members, said removal passages being in communication with said chamber at the center thereof and functioning to remove said layer of low viscosity fluid.

2. A vortex rate sensor comprising: a first member having a first surface thereon; a second member having a second surface thereon; coupling means positioned between said first surface of said first member and said second surface of said second member so as to form a chamber symmetrical about an axis; an outlet passage within said first member; means for providing a high density fluid flow through said coupling means, said chamber and said outlet passage; a first annular passage within said first member and a second annular passage within said second member, said first and said second annular passages being in communication with said chamber at the periphery thereof; means for providing a flow of low viscosity fluid through said first and second annular passages, said low viscosity fluid forming a layer intermediate said high density fluid and said plane surfaces so as to substantially reduce the viscous losses in the flow of said high density fluid through said chamber.

3. A vortex fluid amplifier comprising: a first member having a plane surface thereon; a second member having a convex surface thereon; coupling means positioned between said plane surface and said convex surface so as to form a chamber symmetrical about an axis; an outlet passage within said first member; means for providing a high density fluid flow through said coupling means, said chamber and said outlet passage; a first annular passage within said first member and in communication with said chamber; a second annular passage within said second member, and in communication with said chamber; and means for providing a flow of low viscosity fluid through said first and second annular passages, said low viscosity fluid forming a layer intermediate said high density fluid and said surfaces so as to substantially reduce the viscous losses in the flow of said high density fluid through said chamber.

4. A vortex fluid amplifier comprising: a first member having a surface thereon; a second member having a surface thereon; coupling means positioned between said surfaces so as to form a chamber symmetrical about an axis; an outlet passage within said first member; means for providing a high density fluid flow through said coupling means, said chamber and said outlet passage; and means for heating said first member and said second member so as to provide a layer of low viscosity fluid intermediate said high density fluid and said surfaces so as to substantially reduce the viscous losses in the flow of said high density fluid through said chamber.

5. In a vortex fluid amplifier: means forming a chamber symmetrical about an axis, said chamber having at least one convex interior surface; outlet passage means in fluid communication with said chamber; means for providing for a radial flow of a relatively high density fluid through said chamber and out said outlet passage means; means for introducing a vortical component to said fluid flow; and means for providing a layer of a second fluid having relatively low viscosity adjacent said at least one convex surface so as to substantially reduce viscous losses of said high density fluid flow through said chamber.

6. In a vortex fluid amplifier: means forming a chamber symmetrical about an axis including at least one convex interior surface; outlet passage means in fluid communication with said chamber; means for providing for a radial flow of a relatively high density fluid through said chamber and out said outlet passage means; means for introducing a vortical component to said fluid flow; and means for providing a layer of relatively low viscosity fluid adjacent said convex surface so as to reduce substantially viscous losses of said high density fluid flow through said chamber.

References Cited by the Examiner

UNITED STATES PATENTS

| | | | |
|---|---|---|---|
| 1,841,606 | 1/1932 | Kollsman | 74—5.7 |
| 2,224,403 | 12/1940 | Lines | 137—13 |
| 2,533,878 | 12/1950 | Clark et al. | 137—13 |
| 2,706,534 | 4/1955 | Hunter | 137—13 |
| 2,821,205 | 1/1958 | Chilton et al. | 137—13 |
| 3,040,760 | 6/1962 | Macks | 137—13 |

OTHER REFERENCES

Flow in a Viscous Vortex by Pengelley, Journal of Applied Physics, vol. 28, No. 1, January 1957, pp. 86–92, 73–204.

Fluid Logic Devices and Circuits by Mitchell et al. (reprint from transactions of the Society of Instrument Technology), Feb. 26, 1963, pp. 3 and 7–16.

Vortex Valve Development by E. M. Dexter, Apr. 17, 1961 (paper presented in 1961 on or about Apr. 21 at Detroit, The Society of Automotive Engineers), pp. 1–7 and FIG. 4.

M. CARY NELSON, *Primary Examiner.*

SAMUEL FEINBERG, *Examiner.*

R. STAHL, S. SCOTT, *Assistant Examiners.*